United States Patent
del Prado et al.

(10) Patent No.: US 7,336,634 B2
(45) Date of Patent: Feb. 26, 2008

(54) METHOD AND SYSTEM FOR GENERATING AND UPDATING TRANSMISSION RATE FOR LINK ADAPTATION IN IEEE 802.11 WLAN

(75) Inventors: Javier del Prado, Ossining, NY (US); Sunghyun Choi, Montvale, NJ (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 933 days.

(21) Appl. No.: 10/205,272

(22) Filed: Jul. 25, 2002

(65) Prior Publication Data

US 2004/0017790 A1 Jan. 29, 2004

(51) Int. Cl.
*H04Q 7/00* (2006.01)

(52) U.S. Cl. .................... 370/332; 455/67.13

(58) Field of Classification Search ............ None
See application file for complete search history.

(56) References Cited

U.S. PATENT DOCUMENTS

| | | | |
|---|---|---|---|
| 5,809,430 A | * | 9/1998 | D'Amico .............. 455/525 |
| 6,256,477 B1 | * | 7/2001 | Eidson et al. .............. 455/63.3 |
| 6,266,528 B1 | * | 7/2001 | Farzaneh ................. 455/423 |
| 6,295,289 B1 | * | 9/2001 | Ionescu et al. ............ 370/342 |
| 6,771,628 B1 | * | 8/2004 | Soderkvist et al. ......... 370/337 |
| 7,010,316 B2 | * | 3/2006 | Chen .................... 455/522 |
| 7,142,867 B1 | * | 11/2006 | Gandhi et al. ............. 455/453 |
| 7,190,964 B2 | * | 3/2007 | Damnjanovic et al. ..... 455/522 |
| 7,215,653 B2 | * | 5/2007 | Kim et al. ............... 370/329 |
| 2002/0150065 A1 | * | 10/2002 | Ponnekanti ............... 370/334 |
| 2003/0060171 A1 | * | 3/2003 | Lovberg et al. ............ 455/73 |
| 2003/0165190 A1 | * | 9/2003 | Sindhushayana et al. ... 375/225 |
| 2004/0152471 A1 | * | 8/2004 | MacDonald et al. ...... 455/456.1 |
| 2004/0157618 A1 | * | 8/2004 | Brouwer ................. 455/453 |
| 2004/0266360 A1 | * | 12/2004 | Hamalainen et al. ..... 455/67.16 |

* cited by examiner

*Primary Examiner*—Phirin Sam
(74) *Attorney, Agent, or Firm*—Eric M. Bram

(57) ABSTRACT

A method and system for determining the transmission rate between a plurality of stations in a wireless local area network (WLAN) are provided. Each mobile station evaluates the current link condition based on the Received Signal Strength (RSS) from received frames and adjusts a new transmission rate according to predetermined criteria, which is updated based on whether the transmission of subsequent signals is successful.

23 Claims, 4 Drawing Sheets

METHOD AND SYSTEM FOR GENERATING AND UPDATING TRANSMISSION RATE FOR LINK ADAPTATION IN IEEE 802.11 WLAN

BACKGROUND AND SUMMARY

The present invention relates to communication systems. More particularly, the present invention relates to a system and method for generating and updating a transmission-rate reference table based on the received signal-strength measurement and for using this table to more accurately adjust the transmission rate of each station in an IEEE 802.11 wireless local area network (WLAN).

The IEEE 802.11 standard specifies the medium access control (MAC) and physical characteristics for a wireless local area network (WLAN) to support physical layer units. The IEEE 802.11 standard is defined in International Standard ISO/IEC 8802-11, "Information Technology—Telecommunications and information exchange area networks," 1999 Edition, which is hereby incorporated by reference in its entirety.

The IEEE 802.11 Physical Layers (PHYs) define a plurality of transmission rates based on different modulations and channel-coding schemes so that the transmitter of a frame can choose one of the multiple rates based on the wireless channel condition between the receiver and itself at a particular time. In general, the lower the transmission rate, the more reliable the transmission. Many different algorithms have been proposed in selecting transmission rate but they require some kind of communication between the transmitter and the receiver regarding the link condition. For example, the transmitting STA needs to know the Signal-to-Interference Ratio (SIR) and the frame-error rate for different transmission rates at the receiving end in order to determine the best transmission rate at a given time. Moreover, the IEEE 802.11 standard is silent about the interoperability between devices from different vendors, which may or may not include the means to select the right transmission rate.

Accordingly, the present invention provides a novel algorithm capable of providing a dynamic rate adaptation based on the Received Signal Strength (RSS) measured from the received frames. The inventive algorithm is totally independent from the receiving side and does not require any change in the current MAC operation of the STA.

The present invention is directed to a system and method of adjusting the transmission rate in a wireless local area network (WLAN) based on the Received Signal Strength (RSS) measured from frames received therein.

One aspect of the invention relates to a method for determining the transmission rate of a mobile station among a plurality of transmission rates and includes the following steps: measuring an average Received Signal Strength (RSS) value from a plurality of incoming frames received by the mobile station; comparing the averaged RSS value to a predetermined reference table having a minimum RSS required for a particular frame length to transmit at one of the plurality of the transmission rates; and, selecting a new transmission rate of the mobile station for a subsequent transmission of a new frame based on the comparison outcome. The method further includes the steps of: determining whether the new frame is a retransmission of an earlier frame; if so, determining whether the new frame has been transmitted more than a predetermined number of times before; and, setting the new transmission rate to a next lower rate irrespective of the comparison outcome if retransmitted more than the predetermined number of times. If the new frame is not the retransmission of an earlier frame, the length of the new frame is determined, then the averaged RSS value is compared to the minimum RSS required for transmitting the new frame at one of the plurality of the transmission rates in the predetermined reference table. Thereafter, the transmission rate of the new frame is set to the rate that corresponds to a largest minimum RSS but smaller than the averaged RSS from the predetermined table.

According to another aspect of the invention, the minimum RSS values of the predetermined reference table are updated depending on whether the transmission of the new frame is successful based on a response frame received thereon. If unsuccessful, the predetermined reference table using the averaged RSS value is updated. If successful, the received signal strength (RSS) from the response frame is measured, and the predetermined reference table is updated if the measured RSS from the response frame is lower than a current minimum RSS value of the predetermined reference table. Further, the predetermined reference table is updated when the measured RSS value is higher than the minimum RSS value for a next higher rate in the predetermined reference table if the new frame is a retransmitted frame.

Another aspect of the invention relates to a system for determining the transmission rate among a plurality of transmission rates and includes a receiver circuit for demodulating an incoming frame; a power-measurement circuit for measuring a Received Signal Strength (RSS) of the incoming frame received therein; a processor, coupled to the power-measurement circuit, for computing an averaged RSS and selecting a new transmission rate for the transmission of a new frame based on a comparison outcome to a predetermined reference table, the predetermined reference table including a minimum RSS required for a particular frame length to transmit at one of the plurality of the transmission rates; and, a memory, coupled to the processor, for storing the predetermined reference table and the averaged RSS for a subsequent retrieval. The system further includes a transmitter circuit for modulating the new frame based on the new transmission rate.

The foregoing and other features and advantages of the invention will be apparent from the following, more detailed description of preferred embodiments as illustrated in the accompanying drawings in which reference characters refer to the same parts throughout the various views.

DETAILED DESCRIPTION OF THE EMBODIMENTS

While the present invention is described hereinafter with particular reference to the system-block diagram of FIG. 1, it is to be understood at the outset of the description which follows that the apparatus and methods in accordance with the present invention may be used with other infrastructures, in which a station is communicating with another station via the wireless medium.

Figure 1:
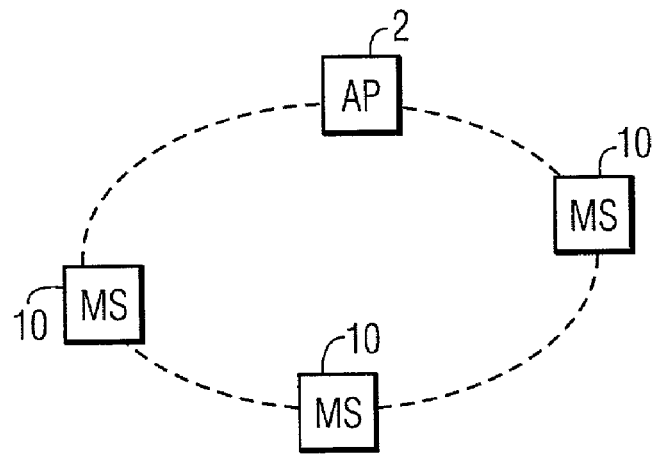
FIG. 1 is a simplified block diagram illustrating the architecture of a wireless communication system whereto embodiments of the present invention are applied.

FIG. 1 illustrates a representative network whereto the embodiments of the present invention are applied. As shown in FIG. 1, an access point (AP) 2 is coupled to a plurality of mobile stations ($STA_1$) 10, which, through a wireless link, are communicating with each other and with the AP. A key principle of the present invention is that irrespective of the receiver performance and channel behavior, the frame-error probability depends on the Signal to Noise Ratio (SNR) at the receiver, its transmission rate and its length. On average, the transmitting STA can estimate the path loss and channel behavior relatively by keeping track of the RSS measured from the frames sent by a receiving STA. Note that in a typical IEEE 802.11 STA implementation, the RSS is available to the Medium Access Control (MAC) protocol. Hence, as long as the receiving STA uses a fixed transmission-power level for all its transmissions, the changes in the RSS can be used to provide a mechanism to generate and update a transmission-rate reference for the subsequent transmission of frames, such that frames are transmitted at just the right transmission rate.

Figure 2:
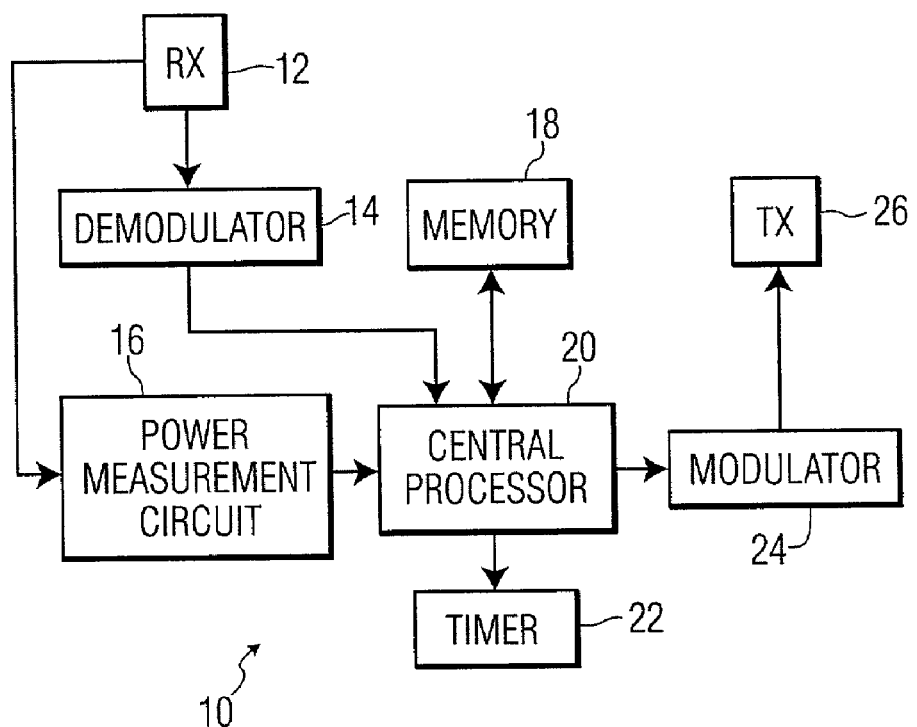
FIG. 2 illustrates the simplified circuit diagram of an access point and each station within a particular basic service set (BSS) according to the embodiment of the present invention.

Referring to FIG. 2, the AP and each STA within the WLAN of FIG. 1 may include a system with an architecture that is illustrated in the block diagram of FIG. 2. Both the AP and STA may include a receiver 12, a demodulator 14, a power measurement circuit 16, a memory 18, a control processor 20, a timer 22, a modulator 24, and a transmitter 26. Although the description may refer to terms commonly used in describing particular mobile stations, the description and concepts equally apply to other processing systems, including systems having architectures dissimilar to those shown in FIG. 2. The processor 20 may represent, i.e., a microprocessor, a central processing unit, a computer, a circuit card, an application-specific integrated circuit (ASICs). The memory 18 may represent, i.e., disk-based optical or magnetic storage units, electronic memories, as well as portions or combinations of these and other memory devices. In other embodiments, however, hardware circuitry may be used in place of, or in combination with, software instructions to implement the invention.

In operation, the receiver 12 and the transmitter 26 are coupled to an antenna (not shown) to convert received signals and transmit desired data into corresponding digital data via the demodulator 14 and the modulator 24, respectively. The power-measurement circuit 16 operates under the control of the processor 20 to detect the RSS of the frame received thereon. The RSS with respect to other stations is estimated and stored in the memory 18, which is coupled to the processor 20 for subsequent retrieval. The estimated RSS with respect to other stations within the same BSS is updated and later used to generate a reference table that is used to select the right transmission rate. The timer 22 is used to eliminate the outdated RSS estimation, which is stored in the memory 18. In the embodiment, the RSS is updated as it tends to change due to the time-varying nature of the wireless channel as well as the potential mobility of WLAN STAs.

Figure 3:
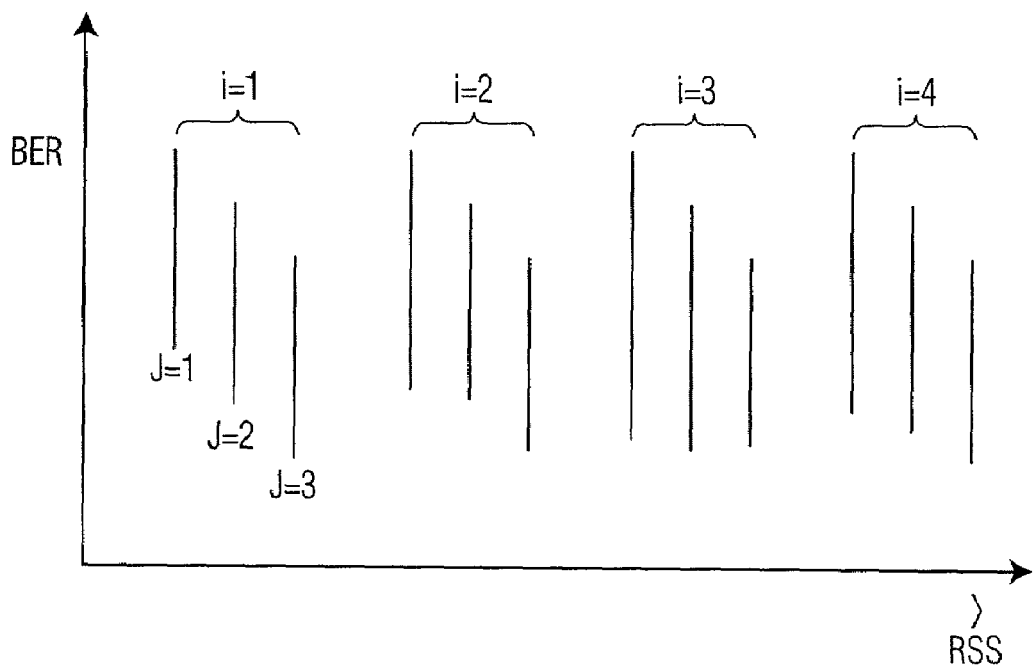
FIG. 3 is a graphical illustration of the transmission reference used to adjust the transmission rate according to an embodiment of the present invention.

FIG. 3, by way of example, represents a transmission-reference table that is generated and updated according to the inventive algorithm (explained later) to select the right transmission rate according to the embodiment of the present invention. Each time a transmitting STA sends a frame having a particular length and receives a corresponding acknowledgement signal, the transmitting STA generates or updates the threshold boundary based on the measured RSS in the reference table to be used in the subsequent transmission of frames. Once the RSS threshold boundary is established for each of the different frame intervals (i.e., 0-100 bytes, 100-1000 bytes, and 1000-2400 bytes), the transmitting STA adapts the transmission rate depending on the RSS measured from the frames it receives from the receiving STA. Note that changes in the RSS indicate that the conditions in the wireless link between the transmitting STA and the receiving STA are changing. As shown in FIG. 3, the respective threshold boundaries indicate which is the minimum RSS values required for a particular transmission PHY rate. For example, if an STA, that is monitoring the RSS from frames sent by the receiving STA, detects that the RSS is becoming lower than one of the thresholds (i.e., due to an increasing distance between the receiving STA and the transmitting STA), the next transmission attempt may be at a lower rate to ensure the correct reception of the frame.

Figure 4:
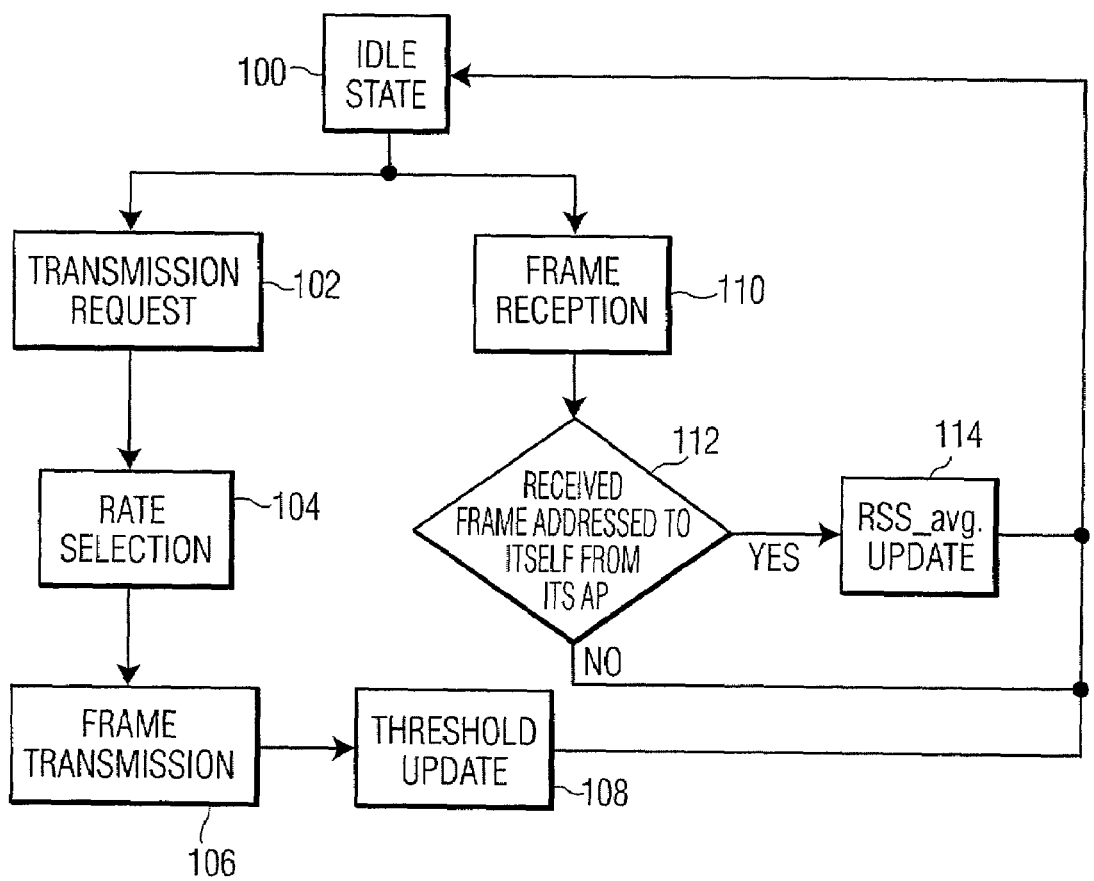
FIG. 4 is a flow chart illustrating the operation steps of generating and updating a transmission reference according to an embodiment of the present invention.
Figure 5:
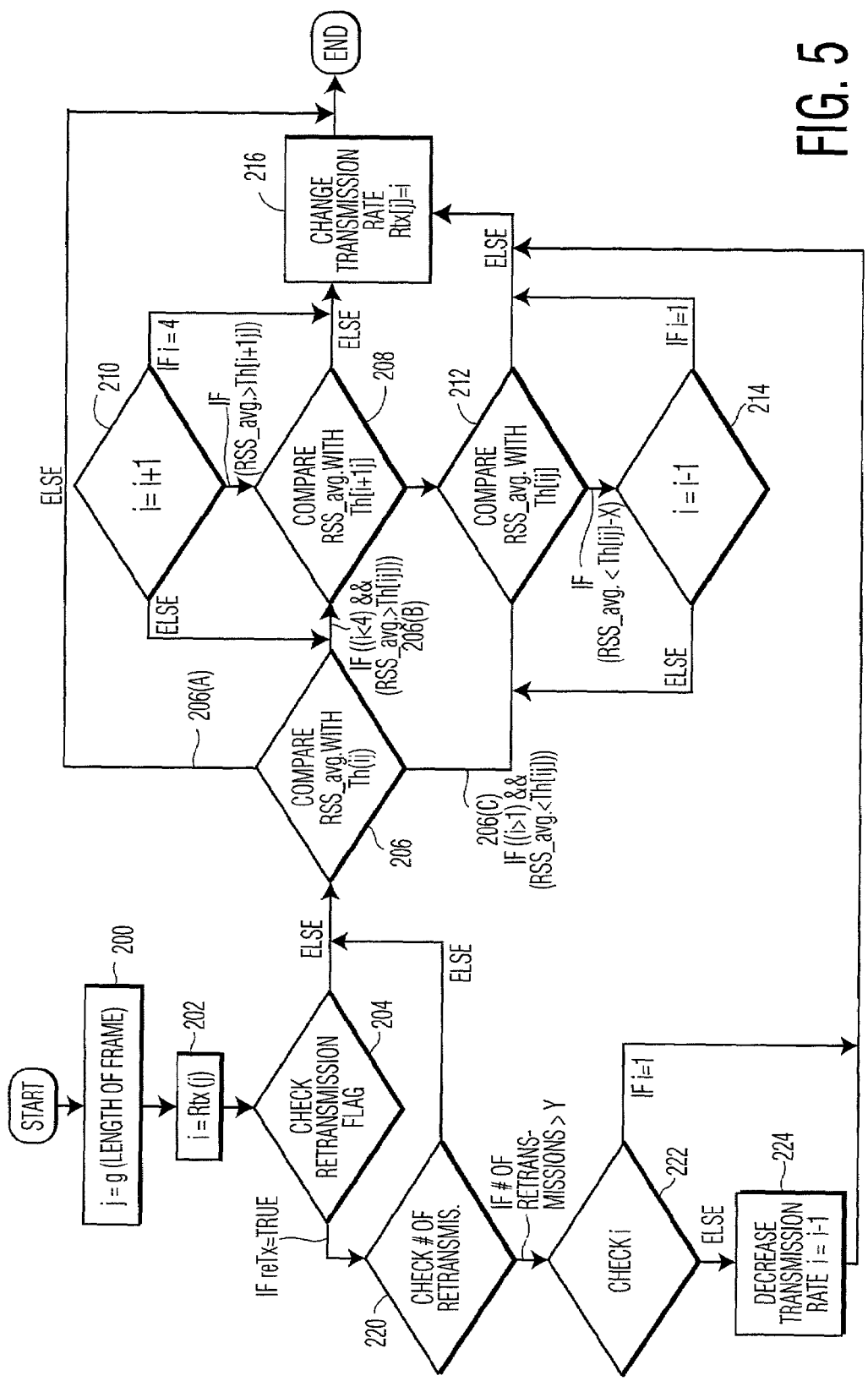
FIG. 5 is a flow chart illustrating the operation steps of selecting the transmission rate according to an embodiment of the present invention; and, FIG. 6 is a flow chart illustrating the operation steps of updating the transmission reference according to an embodiment of the present invention.
Figure 6:
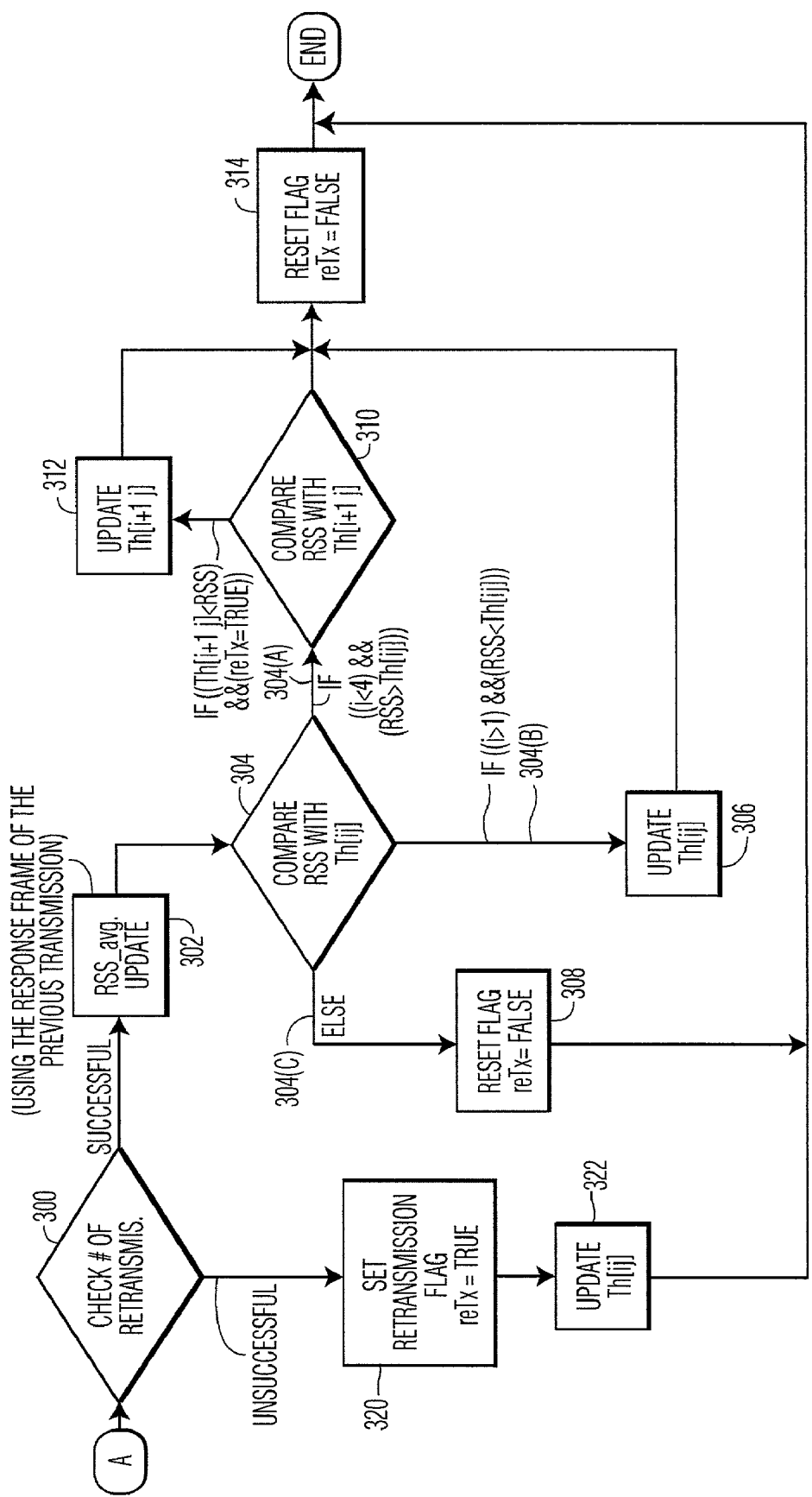

Now, a detailed description of the algorithm for generating and updating the reference table according to the present invention is explained hereafter with reference to FIGS. 4-6.

Below is a list of variables used in FIGS. 4-6:

| | | |
|---|---|---|
| i | Index for data rate | f: rate i = {1, 2, 5.5, 11} (Mbps) = {1, 2, 3, 4} |
| j | Index for frame length | g: length j = {0-100, 100-1000, 1000-2400} (bytes) = {1, 2, 3} |
| Rtx [j] | Transmission rate for length index j | 0 < Rtx[j] < 5 |
| Th [i, j] | Matrix of Rate Thresholds | 0 < i < 5 & 0 < j < 4 |
| RSS | Most recent Received Signal Strength measurement | |
| RSS_avg | Average Received Signal Strength | |
| X | Hysteresis threshold value | 0.5 dB by default |
| Y | Retransmission limit | 4 by default |

Briefly, the frame-length interval, j={1, 2, 3}, represents different frame sizes of 0-100 bytes, 100-1000 bytes, and 1000-2400 bytes, respectively. The data rate i={1, 2, 3, 4} represents one of the four available data rates in this example, i.e., 1, 2, 5.5 and 11 Mbps. The RSS thresholds will be defined for each of the intervals. The threshold "Th[i,j]" represents the minimum "RSS_avg" value to transmit a frame within the length interval "j" at a data rate "i". Thus, each STA will have 12 thresholds "Th[i,j]". Thus, "Th[i,j]" is the boundary between the data rate "i" and "i−1" for frames within the length interval "j". For example, "Th[3,3]" is the minimum "RSS_avg" value to guarantee the correct transmission of the frame of length between 1000 and 2400 bytes at PHY mode 3 (i.e., 5.5 Mbps). If the "RSS_avg" measured value decreases below "Th[3,3]", frames longer than 1000 bytes will be transmitted at the PHY mode 1 (i.e., 1 Mbps) or 2 (i.e., 2 Mbps). Note that values for "X" and "Y" are as default by the designer but can be changed as occasion demands.

FIG. 4 illustrates the overall operation of adjusting the transmission rate based on the RSS measured from the frames that a particular mobile unit receives from the receiving STA. During any given idle state at step 100, the mobile unit is configured to operate in two modes: (1) the receiving mode; and, (2) the transmitting mode. During the receiving mode in step 110, upon reception of any frame addressed to itself or broadcasted/multicasted from the receiving STA in step 112, the transmitting STA will update the "RSS_avg" using the RSS measured from the received frame in step 114. Note that the block diagram is shown for an 802.11 STA operating in a Basic Service Set in FIG. 4, in which case all the frames are always transmitted/received to/from its AP. Hence the receiving STA here mentioned is always its AP. The updating of the "RSS_avg" in step 114 is performed according to the following equation:

$$RSS\_avg_{new}:=a_3*RSS\_avg_{old}+a_4*RSS,$$

wherein $a_3$ and $a_4$ satisfy the condition of: $a_3+a_4=1$, $a_3 \geq 0$, $a_4 \geq 0$, and RSS represents a current received signal strength.

During the transmitting mode, the STA transmits a request signal to transmit data in step 102, then selects a transmission rate based the values of "RSS_avg," thresholds, frame size, and number of retransmission attempts in step 104 (explained later in detail with reference to FIG. 5). Here, the rate adaptation occurs when the average RSS measured from the received frame passes some thresholds in the reference table, which contains the minimum RSS values required for a particular transmission rate. Thereafter, the STA transmits the frame at the selected transmission rate in step 106. Depending on whether the transmission was successful, the STA updates the corresponding "threshold" in the reference table in step 108 (explained later in detail with reference to FIG. 6). If the acknowledgement signal is not received in response to the transmitted frame, the transmission rate may be lowered depending on the number of retransmissions.

FIG. 5 illustrates the rate-selection algorithm for selecting the right transmission rate as discussed in step 104 of FIG. 4. The first operation performed by the algorithm when a frame needs to be transmitted is to check the frame length and assign the corresponding value to the variable "j" in step 200. The next step will be to assign the variable "i" as the most recent rate ("Rtx[j]") used for frames within the length interval "j" in step 202. Note that the highest transmission rate, i=4, is always selected initially. The rate-selection algorithm will differ depending on the retransmission flag. If the current transmission attempt is a retransmission in step 204 and the number of retransmissions exceeds "Y" in step 220, the transmission rate is decreased in step 224. If it is not a retransmission, the value of the "RSS_avg" measured from frames sent by the AP is compared with the thresholds to adjust the data rate if necessary in step 206.

Note that in the beginning, the transmission reference table is not available; however, as an STA transmits a number of different packets according to the steps shown in FIG. 5, the reference table will be generated during the "threshold" updating step 108 of FIG. 4. Thus, for the purpose of completing the remaining operation steps in FIG. 5, it will be assumed that at least some portion of the reference table has been generated. The process repeats again starting from steps 200 through 204 as described before, and if the transmission is not successful and the number of retransmissions exceeds the value of "Y" in step 220 and 222, respectively, the rate-selection algorithm will decrease the data rate in step 224. If it is not a retransmission, the STA proceeds with step 206. If the "RSS_avg" value is higher than the "threshold value" and the current "i" value is less than 4 (i<4) in step 206(b), the "RSS_avg" is compared with the next higher transmission-rate threshold within the same frame length in step 208, and if the "RSS_avg" is still higher than the next higher transmission-rate threshold, the next higher transmission rate is selected in step 210, thus changing the transmission rate to the next higher rate in step 216. Meanwhile, if the "RSS_avg" value is lower than the "threshold" and the current "i" value is greater than 1 (i>1) in step 206(c), the "RSS_avg" is compared with the transmission-rate threshold in step 212. Note that here the actual value of "RSS_avg" is compared with the threshold "Th[i,j]" minus "X". The "X" represents a hysteresis protection to avoid the algorithm decreasing to a lower data rate when it may not be necessary. If the "RSS_avg" is lower than the "threshold value minus X", the next lower transmission rate is selected in step 214, thereby changing the transmission rate to the next lower rate in step 216.

Referring to FIG. 6, the thresholds "Th[i,j]" are updated upon transmission of a frame that requires a response, i.e., an acknowledgement (ACK) frame. Note that from the process described above, the rate-selection algorithm chose the rate "i" for the transmission because Th[i,j] <RSS_avg≤Th[i,j+1] at that particular moment. If the transmission at the rate "i" is successful in step 300, the STA measures the RSS from the response frame in step 302 and proceeds with the update of the thresholds. The algorithm to update the thresholds is as follows:

$$Th[i,j]_{new}:=a_1*Th[i,j]_{old}+a_2*RSS \qquad (1),$$

where $a_1+a_2=1$, $a_1 \geq 0$, $a_2 \geq 0$, and RSS represents the received signal strength measured from the last frame received. The measured RSS is compared to the threshold "Th[i,j]" in step 304. If the measured RSS is lower than the current threshold and the current "i" value is greater than 1 (i>1), in step 304b, this means that the STA can transmit at the data rate "i" when the RSS_avg is as low as the RSS just measured, thus the threshold "Th[i,j]" is decreased in step 306. On the other hand, if the RSS measured is higher than the threshold "Th[i+1,j]" and the current "i" value is less than 4 (i<4) in step 304(a), the transmission should be set at a higher data rate "i+1" depending on whether the current transmission attempt is a retransmission in step 310. That is, if the current transmission is a retransmission at the rate "i" because transmissions at the rate "i+1" were failing for the current "RSS_avg", the algorithm updates the value of the threshold "Th[i+1,j]" in step 312. If both 304(a) and 304(b) are false, the STA resets the retransmission flag in 308 and continues its operation.

Meanwhile, if the transmissions at the rate "i" are unsuccessful in step 300, this implies that the "Th[i,j]" is set too low. The STA sets the retransmission flag in step 320. In this case, it is necessary to increase the threshold. For the update, the STA will use the last measured "RSS_avg" instead of the RSS in Eq. (1) to update the "Th[i,j]" in step 322. As a result, in the next transmissions, the STA should transmit at a lower data rate.

As is apparent from the foregoing, the present invention has an advantage in that, unlike the prior art, the decision to select a particular transmission is solely determined by the transmitting STA based on the Received Signal Strength measured from the received frame. Moreover, the algorithm to select the right transmission rate is achieved without making any change in the current IEEE 802.11 WLAN Medium Access Control specification.

While the preferred embodiments of the present invention have been illustrated and described, it will be understood by those skilled in the art that various changes and modifications may be made, and equivalents may be substituted for elements thereof without departing from the true scope of the present invention. In addition, many modifications may be made to adapt to a particular situation and the teaching of the present invention without departing from the central scope. Therefore, it is intended that the present invention not be limited to the particular embodiment disclosed as the best mode contemplated for carrying out the present invention, but that the present invention include all embodiments falling within the scope of the appended claims.

What is claimed is:

1. A method for determining the transmission rate of a mobile station among a plurality of transmission rates, the method comprising the steps of:

measuring an averaged Received Signal Strength (RSS) value from a plurality of incoming frames received by said mobile station;

comparing said averaged RSS value to a predetermined reference table having a minimum RSS required for a particular frame length to transmit at one of the plurality of said transmission rates;

selecting a new transmission rate of said mobile station for a subsequent transmission of a new frame based on said comparison outcome;

determining whether said new frame is a retransmission of an earlier frame;

if so, determining whether said new frame has been transmitted more than a predetermined number of times before; and, setting said new transmission rate to a next lower rate irrespective of said comparison outcome if retransmitted more than said predetermined number of times.

2. The method of claim 1, further comprising the steps of:

if said new frame is not the retransmission of an earlier frame, determining the length of said new frame;

comparing said averaged RSS value to the minimum RSS required for transmitting said new frame at one of the plurality of said transmission rates in said predetermined reference table; and, setting the transmission rate of said new frame to the rate that corresponds to a largest minimum RSS but smaller than said averaged RSS from said predetermined table.

3. The method of claim 1, wherein said averaged RSS value is computed according to the following equation:

$$RSS\_avg_{new}:=a_3 * RSS\_avg_{old}+a_4*RSS,$$

wherein $a_3$ and $a_4$ satisfy the condition of: $a_3a_4=1$, $a_3 \geq 0$, $a_4 \geq 0$, and RSS represents a current received signal strength.

4. The method of claim 1, further comprising the step of transmitting said new frame at said new transmission rate by said mobile station.

5. The method of claim 4, further comprising the steps of:

updating the minimum RSS values of said predetermined reference table depending on whether the transmission of said new frame is successful based on a response frame received thereon; and, if unsuccessful, updating said predetermined reference table using said average RSS value.

6. The method of claim 5, further comprises the steps of:

if the transmission of said new frame is successful, measuring a received signal strength (RSS) from said response frame;

updating said predetermined reference table when said measured RSS from said response frame is lower than a current minimum RSS value of said predetermined reference table; and updating said predetermined reference table when said measured RSS value is higher than the minimum RSS value for a next higher rate in said predetermined reference table if said new frame is a retransmitted frame.

7. The method of claim 5, wherein the step of updating the minimum RSS values of said predetermined reference table is performed according to the following equation:

$$Th[i,j]_{new}:=a_1*Th[i,j]_{old}=a_2*RSS,$$

wherein Th[i,j] represents the minimum RSS, i represents different data rates, j represents different frame lengths, RSS represents a current received signal strength of said incoming frame, and $a_1$ and $a_2$ satisfy the condition of: $a_1+a_2=1$, $a_1 \geq 0$, $a_2 \geq 0$.

8. The method of claim 1, further comprising the step of storing said averaged RSS value in a memory medium for a predetermined time period.

9. The method of claim 1, wherein said incoming frames are transmitted by an access point (AP).

10. The method of claim 1, wherein said incoming frames are transmitted by another mobile station.

11. The method of claim 1, wherein said mobile station maintains said predetermined reference table for each of receiving mobile stations in communication thereto.

12. A system for determining the transmission rate among a plurality of transmission rates, comprising:

a receiver circuit for demodulating an incoming frame;

a power-measurement circuit for measuring a Received Signal Strength (RSS) of said incoming frame received therein;

a processor, coupled to said power-measurement circuit, for computing an average RSS and selecting a new transmission rate for the transmission of a new frame based on a comparison outcome to a predetermined reference table, said predetermined reference table including a minimum RSS required for a particular frame length to transmit at one of the plurality of said transmission rates; and, a memory, coupled to said processor, for storing said predetermined reference table and said average RSS for a subsequent retrieval; wherein said processor is further operative to: determine whether said new frame is a retransmission of a prior frame; and if so, determine whether said new frame is transmitted more than a predetermined number of times; and lower a current transmission rate to a next lower rate based on said predetermined table if said new frame is transmitted more than said predetermined number of times.

13. The system of claim 12, further comprising a transmitter circuit for modulating said new frame based on said new transmission rate.

14. The system of claim 12, wherein said processor is operative to update said averaged RSS according to the following equation:

$$RSS\_avg_{new}:=a_3 *RSS\_avg_{old}+a_4 *RSS,$$

wherein $a_3$ and $a_4$ satisfy the condition of: $a_3+a_4=1, a_3 \geq 0$, $a_4 \geq 0$, and RSS represents a current received signal strength.

15. The system of claim 12, wherein said processor is further operative to:

compare said averaged RSS to the minimum RSS required for transmission of said new frame in said predetermined reference table; and, set the transmission rate of said new frame to the rate that corresponds to a largest minimum RSS but smaller than said averaged RSS from said predetermined table.

16. The system of claim 12, wherein said processor is further operative to update the minimum RSS of said predetermined reference table depending on whether the transmission of said new frame is successful based on a response frame received thereon; and,
   if unsuccessful, update said predetermined reference table using said average RSS value.

17. The system of claim 16, wherein said processor is further operative to measure a received signal strength (RSS) from said response frame if the transmission of said new frame is successful;
   update said predetermined reference table when said measured RSS from said response frame is lower than a current minimum RSS value of said predetermined reference table; and,
   update said predetermined reference table when said measured RSS value is higher than the minimum RSS value for the next higher rate in said predetermined reference table when said new frame is a retransmitted frame.

18. The system of claim 16, wherein said processor is operative to update the minimum RSS according to the following equation:

$$Th[i,j]_{new} := a_1 * Th[i,j]_{old} + a_2 * RSS,$$

wherein $Th[i,j]$ represents the minimum RSS, i represents different data rates, j represents different frame lengths, RRS represents a current received signal strength, and a1 and a2 satisfy the condition of: $a_{1+a2}=1$, $a_1 \geq 0$, $a_2 \geq 0$.

19. The system of claim 12, wherein said processor is further operative to notify if the transmission of said new frame is unsuccessful, and update said averaged RSS.

20. The system of claim 19, wherein said processor is operative to update said averaged RSS according to the following equation:

$$RSS\_avg_{new} := a_3 * RSS\_avg_{old} + a_4 * RSS,$$

wherein $a_3$ and $a_4$ satisfy the condition of: $a_3+a_4=1, a_3 \geq 0$, $a_4 \geq 0$, and RSS represents a current received signal strength.

21. The system of claim 12, wherein said averaged RSS is stored in said memory for a predetermined time period.

22. The system of claim 12, wherein said incoming frame is transmitted by an access point (AP).

23. The system of claim 12, wherein said incoming frame is transmitted by a mobile station.

* * * * *